(12) United States Patent
Gluck et al.

(10) Patent No.: US 9,152,796 B2
(45) Date of Patent: Oct. 6, 2015

(54) DYNAMIC ANALYSIS INTERPRETER MODIFICATION FOR APPLICATION DATAFLOW

(71) Applicant: salesforce.com, inc., San Francisco, CA (US)

(72) Inventors: Yoel Gluck, San Francisco, CA (US); Xiaoran Wang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 14/288,563

(22) Filed: May 28, 2014

(65) Prior Publication Data

US 2015/0121533 A1 Apr. 30, 2015

Related U.S. Application Data

(63) Continuation-in-part of application No. 14/067,294, filed on Oct. 30, 2013.

(51) Int. Cl.
  *G06F 21/57* (2013.01)
  *G06F 11/36* (2006.01)

(52) U.S. Cl.
  CPC .......... *G06F 21/577* (2013.01); *G06F 11/3604* (2013.01)

(58) Field of Classification Search
  CPC ........................ G06F 11/3604; G06F 21/577
  USPC ............................................. 717/130; 726/25
  See application file for complete search history.

(56) References Cited

U.S. PATENT DOCUMENTS

| | | | |
|---|---|---|---|
| 5,577,188 A | 11/1996 | Zhu | |
| 5,608,872 A | 3/1997 | Schwartz | |
| 5,649,104 A | 7/1997 | Carleton | |
| 5,715,450 A | 2/1998 | Ambrose et al. | |
| 5,761,419 A | 6/1998 | Schwartz | |
| 5,819,038 A | 10/1998 | Carleton | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |

(Continued)

OTHER PUBLICATIONS

Hiroshi et al., Yet Another Taint Mode for PHP, 2011, pp. 1-10.*

(Continued)

*Primary Examiner* — John Chavis
(74) *Attorney, Agent, or Firm* — Dergosits & Noah LLP; Todd A. Noah

(57) ABSTRACT

An interpreter is modified to create a source tracking object for a data object received from a data source and to record information associated with the data source into the source tracking object. The interpreter is modified to create a copy of the data object for a tracking event in an application program, to create a flow tracking object for the tracking event, and to record information associated with the tracking event into the flow tracking object as the tracking event processes the copy of the data object. The interpreter is modified to create a sink tracking object for outputting the copy of the data object to a data sink and to record information associated with the data sink into the sink tracking object. The source tracking object, the flow tracking object, and the sink tracking object are output as dynamic analysis of dataflow in the application program.

20 Claims, 5 Drawing Sheets

(56) References Cited

U.S. PATENT DOCUMENTS

| | | | |
|---|---|---|---|
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes Leon et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2011/0131656 A1* | 6/2011 | Haviv et al. | 726/25 |
| 2012/0233137 A1 | 9/2012 | Jakobson et al. | |
| 2013/0007887 A1* | 1/2013 | Haviv et al. | 726/25 |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0173741 A1* | 6/2014 | Gluck et al. | 726/25 |
| 2014/0173742 A1* | 6/2014 | Gluck et al. | 726/25 |
| 2014/0237604 A1* | 8/2014 | Guarnieri et al. | 726/25 |
| 2014/0258992 A1* | 9/2014 | Guarnieri et al. | 717/131 |
| 2015/0121533 A1* | 4/2015 | Gluck et al. | 726/25 |

OTHER PUBLICATIONS

U.S. Appl. No. 13/998,890.
U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

DYNAMIC ANALYSIS INTERPRETER MODIFICATION FOR APPLICATION DATAFLOW

CLAIM OF PRIORITY

This application is a continuation in part application of U.S. application Ser. No. 14/067,294, SYSTEM AND METHOD FOR DYNAMIC ANALYSIS BYTECODE INJECTION FOR APPLICATION DATAFLOW, filed Oct. 30, 2013, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

One or more implementations relate generally to dynamic analysis interpreter modification for application dataflow.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Vulnerabilities in an application program may be introduced by untrusted data flowing through the application program from an input to an output without the application program performing sufficient actions to prevent potential cyber-security attacks from occurring. For example, an application program may use a uniform resource locator (URL) to receive data that the application program subsequently outputs as data accessed by a web browser, but a web browser displaying a web page based on untrusted data may enable an attacker to gain elevated access-privileges to sensitive web page content. An input for untrusted data is referred to as a taint source, and the output for untrusted data is referred to as a taint sink. Static analysis that tests the security of an application program for vulnerabilities may produce a high rate of false positive results. Dynamic analysis has gained popularity due to the production of fewer false positive results. Therefore, if dynamic analysis identifies a vulnerability in an application program, the vulnerability is more likely to be an actual vulnerability, thereby justifying the expense of sufficient resources in an attempt to analyze the application program's associated dataflow to correct the vulnerability. Dynamic analysis typically identifies application program vulnerabilities such as cross site scripting (XSS) and SQL injection (SQLi).

While dynamic analysis is able to identify application program vulnerabilities by their data sources and data sinks, dynamic analysis does not keep track of the complete flow of tainted data because of problems with recording any information in between the data source and the data sink. Without the information of how data flows in an application program, correcting vulnerabilities is difficult because identifying only a data source and a data sink does not provide any clear indication of the nature of any vulnerabilities between the data source and the data sink. Such difficulties become greater for large application programs, where manually searching source code to review the detailed data flow of possible vulnerabilities is extremely time consuming, and manually identifying the detailed data flow of actual vulnerabilities in the source code is nearly impossible. Additionally, an application program may have multiple possible paths, such as from the same data source to the same data sink. Since dynamic analysis can identify the same vulnerability many times, dynamic analysis typically executes a de-duplication process based on the information describing the vulnerability. Since only the data sources and data sinks are identified, the de-duplication process can mistakenly identify multiple different vulnerabilities that share the same data source and the same data sink as only a single vulnerability. Therefore, identifying all of the actual vulnerabilities becomes more difficult without identifying the specific dataflow between a data source and a data sink. Accordingly, it is desirable to provide techniques that enable a database system to improve the performance, efficiency, and the ease of use of dynamic analysis of dataflow in application programs.

BRIEF SUMMARY

U.S. application Ser. No. 14/067,131 filed Oct. 30, 2013, entitled "System and Method for Dynamic Analysis Tracking Objects for Application Dataflow", which is hereby incorporated herein by reference, teaches creating tracking objects and copies of a tainted data object to enable dynamic analysis to track different copies of the same tainted data objects that take different paths in an application program, such as from the same data source to the same data sink.

However, this approach does not work with singleton or mutable data objects due to the lack of a clear way to copy such data objects. Data objects that are connected to a socket cannot be copied because only one data object is allocated to a socket. Some extremely large data objects may require too many system resources to copy. Even when a way exists to copy a complete data object, a database system has to maintain consistency between all of the copied data objects for the application program logic to function correctly. Maintaining such consistency may not be feasible from a resource point of view, because the database system may create hundreds or even thousands of copies of an original data object when an application invokes functions on numerous occasions. Performance degradation may result due to the central processing unit power and memory space required to create and store each copy of the original data object.

U.S. application Ser. No. 14/067,205 filed Oct. 30, 2013, entitled "System and Method for Dynamic Analysis Wrapper Objects for Application Dataflow", which is hereby incorporated herein by reference, teaches solving such copying challenges by creating tracking objects and a wrapper object that points to a data object, substituting the wrapper object for each instance when the original data object is referenced, and creating copies of the wrapper object whenever a copy of the original data object would have been required. This copying process works with singleton and mutable data objects because only the wrapper object is copied, as the actual data objects are not copied. The use of multiple wrapper objects pointing to a single data object maintains consistency between all of the wrapper objects and all of the subsequent indirect references to the original data object because there is only a single copy of the original data object. The resources needed to copy and store the wrapper objects are slim as a wrapper object has only two fields, a reference to the actual data object and a tracking object. Only a few bytes are needed to store the wrapper object with the tracking object, and copying is not a resource extensive process anymore.

However, this approach does not work when a tainted object is assigned as a field of an untainted object because the information recorded for the untainted object is not associated with the information recorded for the tainted object. For example, if the wrapper object for a tainted object is assigned as a field on a previously untainted data object, and a custom object is used to invoke a method, the information for invoking the method is not tied to the tainted object. A system cannot solve this problem by copying the wrapper object for the data object because the tainted object only affects one field of the data object, not all fields of the data object, whereas the wrapper object points to the object, which includes all fields of the object. Differentiating between fields in the data object would require the system to make copies of the data object itself, instead of making copies of the wrapper object for the data object, but making copies of data objects would reintroduce the aforementioned problems that the substitution of wrapper objects for data objects was used to solve. The consequence is that if a data object is used to invoke any methods and later a tainted object is retrieved as a field from the data object and passed to a data sink, the information for any method invocations may not be depicted in the application program dataflow.

U.S. application Ser. No. 14/067,247 filed Oct. 30, 2013, entitled "System and Method for Dynamic Analysis Tracking Object Associations for Application Dataflow", which is hereby incorporated herein by reference, teaches associating a flow tracking object with another flow tracking object in response to a field retrieval of a copy of a wrapper object from another wrapper object and outputting the associated other flow tracking object as dynamic analysis of dataflow in the application program. For example, the system responds to a field retrieval of the copy of a tainted wrapper object retrieved from a custom object by setting the pointer in the tracking object embedded in the copy of the tainted wrapper object to point to the tracking object embedded in the wrapper object for the custom object, and outputting a sink tracking object as a first node in a graph, the flow tracking object as a second node in the graph, the associated other flow tracking object as a third node in the graph, and the sink tracking object as a fourth node in the graph, with the second node linked to the first node, the third node linked to the second node, and the fourth node linked to the third node to depict the dataflow sequence of the graph. The graph and its associated information depict not only the data source and the data sink, but also depict the dataflow through the application program, which enables the identification of any tracking event as an additional vulnerability.

The dynamic analysis system changes the way that objects are represented in an application program to introduce tracking objects, wrapper objects, and tracking object associations, and to embed dataflow tracking logic into the application program. If the source code of the application program is available, the dynamic analysis system may modify the source code by embedding dataflow tracking logic, and replacing data objects with wrapper objects, but the dynamic analysis system may not have access to the source code of the application program. If the source code of the application program is available, the dynamic analysis system may modify the compiler to produce bytecode that includes dataflow tracking logic and replaces data objects with wrapper objects, but the dynamic analysis system may not have access to the source code of the application program.

The dynamic analysis system may inject bytecode into the application program to include dataflow tracking logic and replace data objects with wrapper objects. If constructed in a way that bypasses some interpreter checking, bytecode injection is compatible across all platforms interpreted by the same interpreter, and does not require the often unavailable source code. However, embedding logic directly in the interpreter is faster than embedding logic in the source code because no interpretation is needed for the embedded logic. Therefore, the dynamic analysis system modifies the interpreter directly so that the bytecode is interpreted in the way that the dynamic analysis system needs, such as replacing data objects with wrapper objects.

The dynamic analysis system modifies the interpreter to construct the dataflow directly by intercepting bytecode instructions that may have influence on the dataflow and modifies the ways these instructions are interpreted so that the dynamic analysis system can collect the tracking information. Modifying the interpreter of one machine is not specific to only one platform. The same source code is modified, compiled, and built on different platforms.

Embodiments provide dynamic analysis interpreter modification for application dataflow. An interpreter is modified to create a source tracking object for a data object received from a data source and to record information associated with the data source into the source tracking object. For example, a system modifies an interpreter to get a parameter from an untrusted data source, store the parameter as a tainted data object, create a source tracking object for the tainted wrapper object, and record information about whether the tainted data source was reflective or stored, and recording line number 1 in the application program where the tainted data was collected, in the embedded source tracking object.

The interpreter is modified to create a copy of the data object for a tracking event in an application program, to create a flow tracking object for the tracking event, and to record information associated with the tracking event into the flow tracking object as the tracking event processes the copy of the data object. For example, the system modifies the interpreter to create a copy of a tainted wrapper object for assignment of the tainted wrapper object as a field of a custom object, create a flow tracking object for assigning the copy of the tainted wrapper object to the field of a custom object, and record information about the field assignment of the tainted wrapper object, and the line number 3 in the application program where the field was assigned to the previously untainted custom object, into the embedded flow tracking object.

The interpreter is modified to create a sink tracking object for outputting the copy of the data object to a data sink and to record information associated with the data sink into the sink tracking object. For example, the system modifies the interpreter to respond to the execution of a field retrieval of the copy of the tainted wrapper object from the previously untainted data object and the printing of the copy of the tainted wrapper object by creating a sink tracking object for the printing of the copy of the tainted wrapper object, and recording information about the data sink, and the line number 5 in the application program where the printing occurred, into the sink tracking object.

The source tracking object, the flow tracking object, and the sink tracking object are output as dynamic analysis of dataflow in the application program. For example, the system outputs the source tracking object as a first node in a graph, the first flow tracking object as a second node in the graph, the associated second flow tracking object as a third node in the graph, and the sink tracking object as a fourth node in the graph, with the second node linked to the first node, the third node linked to the second node, and the fourth node linked to the third node to depict the dataflow sequence of the graph. By associating the second flow tracking object, which recorded information for the previously untainted custom object, with the first flow tracking object, which recorded information for the tainted object, the modified interpreter concatenates previously unrelated information to create a complete dataflow for the tainted data. The graph and its associated information depict not only the data source and the data sink, but also depict the dataflow through the application program, which enables the identification of any tracking event as an additional vulnerability. Accordingly, systems and methods are provided which enable a database system to improve the performance, efficiency, and the ease of use of dynamic analysis of dataflow in application programs.

While one or more implementations and techniques are described with reference to an embodiment in which dynamic analysis interpreter modification for application dataflow is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for dynamic analysis interpreter modification for application dataflow.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for dynamic analysis interpreter modification for application dataflow will be described with reference to example embodiments.

The following detailed description will first describe a method for dynamic analysis interpreter modification for application dataflow.

Then, a block diagram of an example system for dynamic analysis interpreter modification for application dataflow is described.

Next, a block diagram of a portion of example application code and its associated dataflow graph for dynamic analysis interpreter modification for application dataflow is described.

Figure 1:
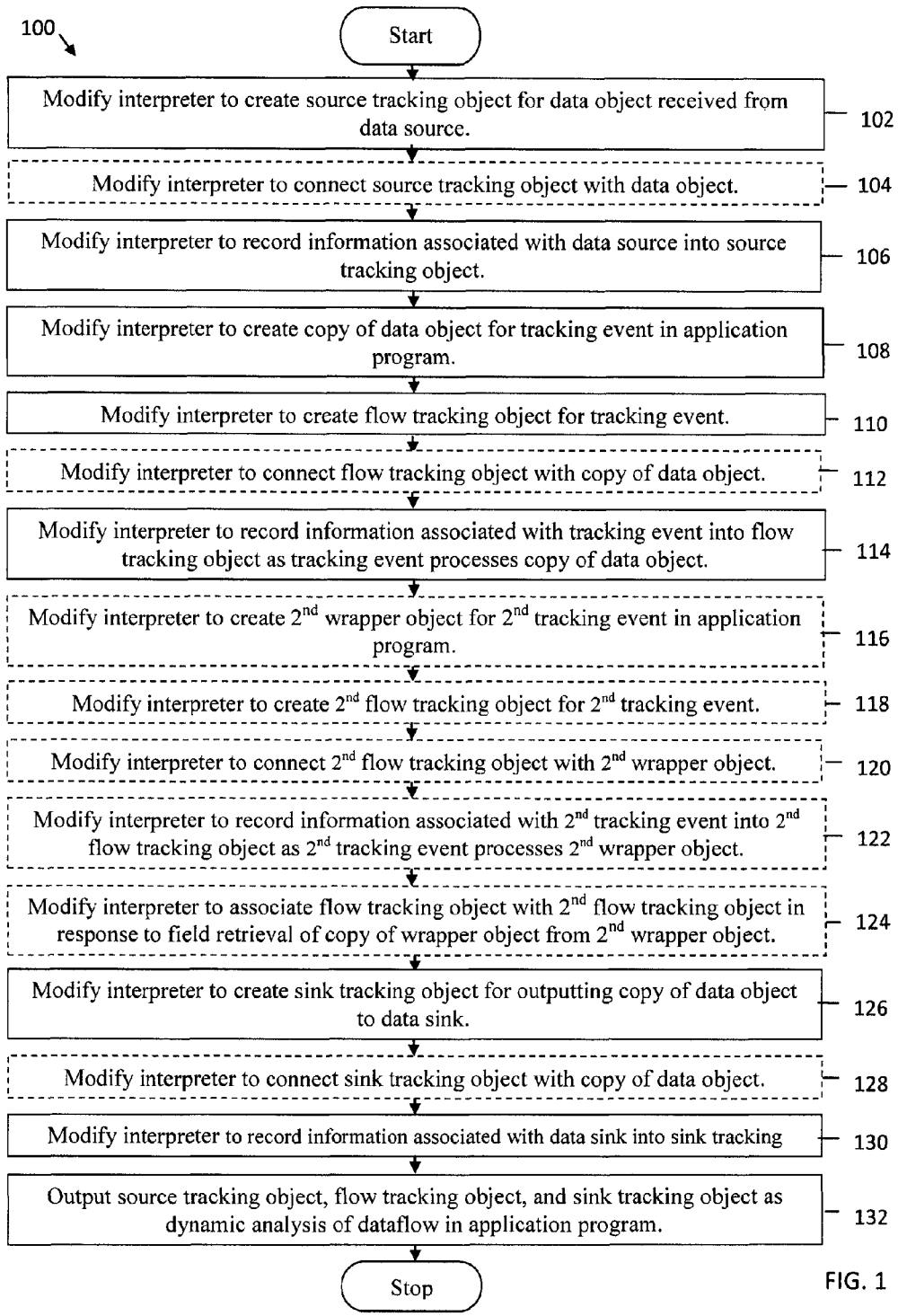
FIG. 1 is an operational flow diagram illustrating a high level overview of a method for dynamic analysis interpreter modification for application dataflow in an embodiment.

FIG. 1 is an operational flow diagram illustrating a high level overview of a method 100 for dynamic analysis interpreter modification for application dataflow. As shown in FIG. 1, a database system can provide dynamic analysis of dataflow in application programs.

In block 102, an interpreter is modified to create a source tracking object for a data object received from data source. For example and without limitation, this can include the database system modifying an interpreter to get a parameter from an untrusted data source, store the parameter as a tainted data object, and create a source tracking object for the tainted data object. Although this example describes the application dataflow beginning with a data source, the application dataflow may begin with any point of interest in the code. A data source can be arbitrarily defined as a point in the code based on whatever logic is required. The database system may modify the interpreter to create a wrapper object that points to the tainted data object and replace the tainted data object with the wrapper object in the bytecode. The database system may modify the interpreter to change references to the data object to references to the wrapper object instead, because the wrapper object will become the new data object with reference to the original data object and taint information. Below is an example pseudo code that represents a data structure of a wrapper object.

```
public class Wrapper{
    private Object element
    private Node node;
}
```

A tracking object may be referred to as a node object, as the tracking object may be subsequently represented by a node in a dataflow graph. Below is an example pseudo code for a data structure of a tracking object, which may be for a source tracking object, a flow tracking object, or a sink tracking object.

```
Public class Node {
  private Node parents[ ];
  private String datapoint;
  private int taint_info;
  private Node potential;
}
```

The parents array attribute points to the parent nodes for the current node. The datapoint attribute stores location identifiers about where tracking information associated with tainted data is collected. Example location identifiers include filenames, line numbers, etc. However, instead of storing a string to represent a location identifier, the database system may modify the interpreter to create a hashmap with an integer as the key and a string as the value, and modify the interpreter to subsequently lookup the hashmap for the actual location of the location identifier, thereby conserving database system resources. The taint_info attribute stores taint information related to the location associated with the tainted data, such as whether it is a data source, a data sink, a sanitization point, etc. A sanitization point is a location in an application program designed to replace potentially dangerous data with non-dangerous data, such as replacing hyper-text markup language (HTML) control characters. In order to efficiently concatenate the information carried by a tracking object for a tainted object and the tracking object for a previously untainted object that now includes the tainted object as a field, the database system does not have to copy the information from the tracking object for the previously untainted object to the tracking object for the tainted object. Instead the database system modifies the interpreter to set the "potential" pointer of the tracking object, or node, of the tainted object to point to the current tracking object, or node, of the previously untainted object. When the tainted object reaches a data sink, the modified interpreter may use the "potential" pointer for the tainted object's node to retrieve the information from the previously untainted object's node(s), and concatenate the retrieved information with the information from the tainted object's node(s) to create a combined dataflow through the application program.

Whenever the modified interpreter comes across a tracking event, be it an object creation, object splitting, etc., the modified interpreter creates a wrapper object and a tracking object and associates them together. In this example, a new tracking object is always created when a new wrapper object is created, thus leading to two object creations for each wrapper creation. Some database system objects, such as Java® Virtual Machine objects, are allocated on a shared collected heap, which is a complex data structure to manage compared to the regular heap space in the C programming language. Object allocation takes time, and the heap needs to be synchronized for all threads in an application program. The modified interpreter may improve the performance of the database system by encapsulating the tracking object into the wrapper object. In effect, the modified interpreter removes the tracking object completely and moves all of the tracking object's fields to the wrapper object. For example:

```
public class Wrapper{
  private String datapoint;
  private Node[ ] parents;
  private Node potential;
  private int taint_info;
    private Object element;
}
```

This modification can effectively halve the time spent on object allocation in the database system. Since many tracking events, thus wrapper creations, exist in a many places in an application program, the performance boost may be significant.

In addition, the modified interpreter may change the datapoint from a string to three integer flags and a class pointer to improve the overall performance by reducing the construction time for the datapoint location string. For example, the following may be the new data structure of a wrapper object.

```
public class Wrapper{
  private int method_id;
  private int version;
  private int bci;
  private Class method_klass;
  private Node[ ] parents;
  private Node potential;
  private int taint_info;
    private Object element;
}
```

The first four fields can be used later to reconstruct the datapoint location as a string in reporting time. In order for the database system to get the location of the current datapoint, it needs to crawl the stack and find the reference to the class file which contains the debugging information for application program locations. By saving only the reference to the class file, the modified interpreter may improve the performance by speeding up the time to record the datapoint and delay the time to get the actual datapoint location from the class file to the reporting time, which can be done concurrently in separate threads.

In block 104, the interpreter is optionally modified to connect a source tracking object with a data object. By way of example and without limitation, this includes the database system modifying the interpreter to embed a source tracking object in a tainted wrapper object, thereby enabling the tracking of tainted data and the associated dataflow as the tainted wrapper object flows through the application program. Such a connection allows the modified interpreter to easily tie the tracking objects and their data flows together without having to create a separate out-of-band mechanism to do this. Alternatively, the modified interpreter may improve the performance of the database system by creating the fields for the tracking object within the wrapper object when creating the wrapper object, as described above in reference to block 102. Additionally, as described below in reference to block 124, embedding a tracking object in a tainted wrapper object leverages the garbage collector, such that when a wrapper object and its tracking object are subsequently deleted, the garbage collector removes the tracking object's associated data flow information as well, leaving the dataflow information for the tracking objects that are not deleted to represent the application dataflow.

In block 106, an interpreter in modified to record information associated with a data source into a source tracking object. In embodiments this can include the database system modifying the interpreter to record information about whether the tainted data source was reflective or stored, and record line number 1 in the application program where the tainted data was collected, in the embedded source tracking object. The database system may modify the interpreter to keep track of the context of the vulnerability, such as the nature of the potential vulnerability (based on the location/type of taint), whether a tainted wrapper object has been validated or sanitized, and what kind of validation, if any, has been done on the tainted wrapper object. Validation of a wrapper object is a verification that the wrapper object does not include tainted data. The database system may also modify the interpreter to keep track of the confidence level of the vulnerability, such as how confident the database system is to classify a dataflow into a specific level of vulnerability. For example, an application program may access taint sources by reading various external files, with some of the files more trusted than the other files. Including a confidence level can help in defining how likely an identified dataflow is a real vulnerability. The database system may also modify the interpreter to include the capability of tracking method invocation on both the caller and the callee sides, which may help a system user to better understand the connection between the wrapper object used when calling the method and the wrapper object used within the called method. The database system may modify the interpreter to record the callee information at the reporting time, and not as the process normally flows. When reporting information after a data sink is reached, the database system can report two data points per function call, at the caller side and at the callee side.

In block 108, an interpreter is modified to create a copy of a data object for a tracking event in an application program. For example and without limitation, this can include the database system modifying the interpreter to create a copy of a tainted wrapper object for assignment of the tainted wrapper object as a field of a custom object. Creating a copy of the tainted wrapper object enables the database system to track different copies of the same tainted wrapper object that take different paths in the application program, such as from the same data source to the same data sink. Creating a copy of the tainted wrapper object is also necessary to prune the dataflow graph to remove irrelevant dataflow information, as discussed below in reference to block 124. Creating a copy of the tainted wrapper object may eliminate false positives and false negatives, because every data flow path is treated independently with its privately copied wrapper objects, such that any changes to the degree of taintedness of the tainted wrapper object in one dataflow path will not be reflected by the degree of taintedness of the tainted wrapper object in another dataflow path.

When copying the wrapper object, the database system essentially creates a new wrapper object, whose "element" field will be pointing to the same original data object to which the previously created wrapper object points. Later, a new tracking object is created and embedded into the new wrapper object, with the tracking object containing any new information about the tainted data. Copying the wrapper object, which may be referred to as "splitting the wrapper," works with singleton and mutable data objects because the actual data objects are not copied. Only the wrapper object is copied, with different tracking objects assigned to record taint information. The data object consistency is automatically maintained because there is only a single copy of the data object. The resources needed to copy and store the wrapper objects are slim because a wrapper object has only two fields, a reference to the actual data object and a tracking object. Only a few bytes are needed to store the wrapper object with the tracking object, and copying is not a resource extensive process anymore. An example of pseudo-code for copying a wrapper object is provided below.

```
public static Wrapper split(Wrapper parent) {
  Wrapper child= new Wrapper( );
  child.element = parent.element;
  // Create a new Node and assign fields to it
  child.node = new Node( );
  child.node.datapoint = hash__lookup(
  current__file__name + current__line__no);
  child.node.parent.insert(parent.node);
  child.node.taint__info =
  calc__taint__info(parent.node.taint__info);
  return child;
}
```

In block 110, an interpreter is modified to create a flow tracking object for a tracking event. By way of example and without limitation, this can include the database system modifying the interpreter to create a flow tracking object for assigning a copy of the tainted wrapper object to a field of a custom object. Modifying the interpreter to create a tracking object is covered in more detail above in reference to block 102. Modifying the interpreter for a tracking event, such as a method invocation, a function call, or an assignment, requires such lengthy and detailed modifications to an application program that these detailed modifications are covered below, after the last block 132 of the method 100 and prior to references to FIG. 2. When the application program assigns an object or a value to an object, the database system records information about this assignment in the flow tracking object, thereby enabling the database system to track tainted wrapper objects as they are passed by assignments. As the tracking objects record information for tracking events, the database system associates the tracking objects together to enable the creation of a complete graph that depicts how tainted data flows in the application program. The database system associates the tracking objects together by having each new tracking object, which represents a new location in the data flow, point to the previous tracking object in the dataflow, such as by having the flow tracking object point to the source tracking object.

In some cases, a single tracking object can have multiple parents, since multiple objects can propagate into a single object. For example, when multiple string objects are concatenated, the output is a single data object that has multiple parents, and each of these parents tracks the dataflow to the source in which the data object was introduced.

In block 112, an interpreter is optionally modified to connect a flow tracking object with a copy of a data object. In embodiments, this can include the database system modifying the interpreter to embed a flow tracking object in a copy of a tainted wrapper object, thereby enabling the tracking of the tainted wrapper object and the associated dataflow as the tainted wrapper object flows through the application program. Such a connection allows the modified interpreter to easily tie the tracking objects and their data flows together without having to create a separate out-of-band mechanism to do this. Alternatively, the modified interpreter may improve the performance of the database system by creating the fields for the tracking object within the wrapper object when creating the wrapper object, as described above in reference to block 102. Additionally, as described below in reference to block 124, embedding a tracking object in a tainted wrapper object leverages the garbage collector, such that when a wrapper object and its tracking object are subsequently deleted, the garbage collector removes the tracking object's associated data flow information as well.

In block 114, an interpreter is modified to record information associated with a tracking event into a flow tracking object as the tracking event processes a copy of a data object. For example and without limitation, this can include the database system modifying the interpreter to record information about the field assignment of the tainted wrapper object, and the line number 3 in the application program where the field was assigned to the previously untainted custom object, into the embedded flow tracking object. Modifying the interpreter to record tracking information into a tracking object is covered in more detail above in reference to block 106.

In block 116, an interpreter is optionally modified to create a copy of a second wrapper object for a second tracking event in an application program. By way of example and without limitation, this can include the database system modifying the interpreter to create a wrapper object for the invocation of a method that uses the previously untainted custom object which had a field assigned using the tainted wrapper object. As mentioned before, modifying the interpreter for a tracking event, such as a method invocation, a function call, or an assignment, requires such lengthy and detailed modifications to an application program that these detailed modifications are covered below, after the last block 132 of the method 100 and prior to references to FIG. 2. Creating a copy of the second wrapper object enables the database system to track different copies of the same wrapper object that take different paths in the application program. Although FIG. 1 describes an example of an application program that may include four tracking events (source, field assignment, method, and field retrieval for a sink), an application program may include fewer or a greater number of tracking events. Modifying the interpreter to create a wrapper object is covered in more detail above in reference to block 108.

In block 118, an interpreter is optionally modified to create a second flow tracking object for a second tracking event. In embodiments, this can include the database system modifying the interpreter to create a flow tracking object for the method invocation using the previously untainted data object. Modifying the interpreter to create a tracking object is covered in more detail above in reference to block 102. When the application program invokes a method, the database system may record an identifier of the method, the method arguments, and any instance object, into the flow tracking object, thereby enabling the database system to track tainted wrapper objects for method invocations that use the tainted wrapper objects as arguments. Similarly, the database system can record information for any other type of tracking event, such as field accesses, stores, array access, etc. As the tracking objects record information for tracking events, the database system associates the tracking objects together to enable the creation of a complete graph that depicts how tainted data flows in the application program. The database system associates the tracking objects together by having each new tracking object, which represents a new location in the data flow, point to the previous tracking object in the dataflow. However, in this example the second tracking object does not point to the first tracking object because the second tracking object records information for the previously untainted custom object while the first tracking object records information for the tainted string "s," which is currently not directly related to the previously untainted custom object.

In block 120, an interpreter is optionally modified to connect a second flow tracking object with a second wrapper object. For example and without limitation, this can include the database system modifying the interpreter to embed the other flow tracking object in the copy of the wrapper object for the previously untainted custom object. Such a connection allows the database system to easily tie tracking objects and their data flows together without having to create a separate out-of-band mechanism to do this. Alternatively, the modified interpreter may improve the performance of the database system by creating the fields for the tracking object within the wrapper object when creating the wrapper object, as described above in reference to block 102. Additionally, as described below in reference to block 124, embedding a tracking object in a tainted wrapper object leverages the garbage collector, such that when a wrapper object and its tracking object are subsequently deleted, the garbage collector removes the tracking object's associated data flow information as well.

In block 122, an interpreter is optionally modified to record information associated with a second tracking event into a second flow tracking object as the second tracking event processes a second wrapper object. By way of example and without limitation, this can include the database system modifying the interpreter to record information about the invoked method, and the line number 4 in the application program where the method was invoked, into the embedded flow tracking object for the previously untainted custom object. Modifying the interpreter to record tracking information into a tracking object is covered in more detail above in reference to block 106.

In block 124, an interpreter is optionally modified to associate a flow tracking object with a second flow tracking object in response to a field retrieval of a copy of a wrapper object from a second wrapper object. In embodiments, this can include the database system modifying the interpreter to respond to the field retrieval of the copy of the tainted wrapper object retrieved from the previously untainted custom object, by setting the "potential" pointer in the tracking object embedded in the copy of the tainted wrapper object to point to the tracking object embedded in the wrapper object for the previously untainted custom object.

The database system modifies the interpreter to strip the wrapper before doing type checking, and then modifies the sensitive instructions inside of each function to make sure the functions are hooked to the runtime analysis unit at runtime. The modified interpreter does type checking on the "element" object, which is the actual object that the wrapper wraps. All type checking in the interpreter is modified so that type checking is done on the actual object instead of the wrapper.

When the database system determines which tracking objects will point to other tracking objects, the database system may also delete any out of scope tracking object when an application program lacks a subsequent reference to a wrapper object that embeds the out of scope tracking object. For example, this can include the database system deleting a flow tracking object when the application program lacks any subsequent references to the corresponding copy of the tainted wrapper object. In this instance, the garbage collector deletes a copy of the tainted wrapper object because subsequent lines in the application program do not reference the copy of the tainted wrapper object, which means that the copy of the tainted wrapper object does not have any impact on the final vulnerability and the application program's dataflow. This enables the database system to prune the dataflow graph to remove the dataflow associated with the copy of the tainted wrapper object as irrelevant.

In block 126, an interpreter is modified to create a sink tracking object for outputting a copy of a data object to a data sink for an application program. For example and without limitation, this can include the database system modifying the interpreter to respond to the execution of a field retrieval of the copy of the tainted wrapper object from the previously untainted data object and the printing the copy of the tainted wrapper object, by creating a sink tracking object for the printing of the copy of the tainted wrapper object. Although this example describes the application dataflow ending with a data sink, the application dataflow may end with any point of interest in the code. A data sink can be arbitrarily defined as a point in the code based on whatever logic is required. Modifying the interpreter to create a tracking object is covered in more detail above in reference to block 102.

In block 128, an interpreter is optionally modified to connect a sink tracking object with a copy of a data object. By way of example and without limitation, this can include the database system modifying the interpreter to embed the sink tracking object into the copy of the tainted wrapper object. Such a connection allows the database system to easily tie the tracking objects and their data flows together without having to create a separate out-of-band mechanism to do this. Alternatively, the modified interpreter may improve the performance of the database system by creating the fields for the tracking object within the wrapper object when creating the wrapper object, as described above in reference to block 102. Additionally, as described above in reference to block 124, embedding a tracking object in a tainted wrapper object leverages the garbage collector, such that when a wrapper object and its tracking object are subsequently deleted, the garbage collector removes the tracking object's associated data flow information as well.

In block 130, an interpreter is modified to record information associated with a data sink into a sink tracking object. In embodiments, this can include the database system modifying the interpreter to record information about the data sink, and the line number 5 in the application program where the printing occurred, into the sink tracking object. Modifying the interpreter to record tracking information into a tracking object is covered in more detail above in reference to block 106.

In block 132, a source tracking object, a first flow tracking object, and a sink tracking object are output as dynamic analysis of dataflow in an application program. For example and without limitation, this can include the database system outputting the source tracking object as a first node in a graph, the first flow tracking object as a second node in the graph, the associated second flow tracking object as a third node in the graph, and the sink tracking object as a fourth node in the graph, with the second node linked to the first node, the third node linked to the second node, and the fourth node linked to the third node to depict the dataflow sequence of the graph. By associating the second flow tracking object, which recorded information for the previously untainted custom object, with the first flow tracking object, which recorded information for the tainted object, the database system concatenates previously unrelated information to create a complete dataflow for the tainted data. Each node in the graph represents a location in the flow of a tainted wrapper object through the application program. As the tainted wrapper objects flowed through the application program, the database system collected information and recorded the information in the tracking objects associated with these nodes. The collection of this information and nodes represents the data flow of a single wrapper object through the nodes being linked together to construct a graphic representation of the dataflow in the application program. The graph and its associated information depict not only the data source and the data sink, but also depict the dataflow through the application program, which enables the identification of any tracking event as an additional vulnerability.

The database system may modify the interpreter to output the source tracking object, the first flow tracking object, and the sink tracking object as dynamic analysis of dataflow in the application program. Alternatively, the database system may provide a reporting engine to output the source tracking object, the first flow tracking object, and the sink tracking object as dynamic analysis of dataflow in the application program based on a rule engine detecting a rule match with the dataflow. In yet another option, the database system may modify the interpreter to create the reporting engine and the rule engine, wherein the reporting engine outputs the source tracking object, the first flow tracking object, and the sink tracking object as dynamic analysis of dataflow in the application program based on the rule engine detecting a rule match with the dataflow.

Accordingly, systems and methods are provided which enable a database system to improve the performance, efficiency, and the ease of use of dynamic analysis of dataflow in application programs. The method 100 may be repeated as desired. Although this disclosure describes the blocks 102-132 executing in a particular order, the blocks 102-132 may be executed in a different order.

Figure 2:
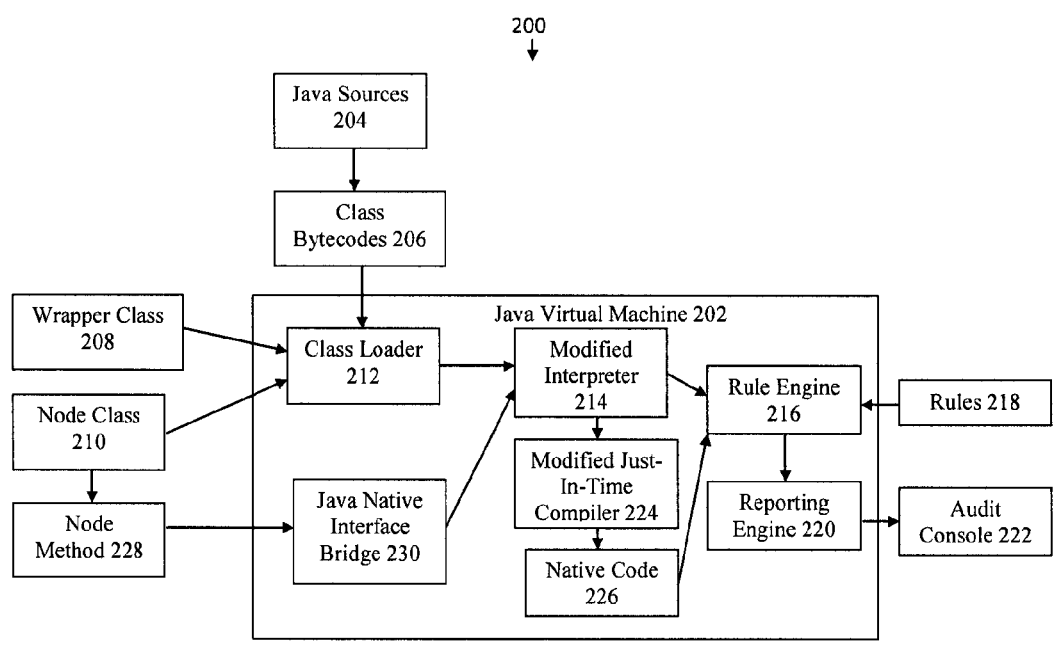
FIG. 2 is a block diagram of an example system for dynamic analysis interpreter modification for application dataflow in an embodiment.

FIG. 2 is a block diagram of an example system for dynamic analysis interpreter modification for application dataflow in an embodiment. Although the system 200 is described as including a Java® virtual machine 202, this is just an example as the system may be implemented using other type of computers. The system 200 may include the Java® virtual machine 202, Java® sources 204, class bytecodes 206, a wrapper class 208, a node class 210, a class loader 212, a modified interpreter 214, a rule engine 216, rules 218, a reporting engine 220, an audit console 222, a modified just-in-time compiler 224, native code 226, node methods 228, and a Java® native interface bridge 230.

As mentioned above in reference to block 132, the database system 200 may provide the reporting engine 220 to output the source tracking object, the first flow tracking object, and the sink tracking object as dynamic analysis of dataflow in the application program based on the rule engine 216 detecting a rule match with the dataflow. In yet another option, the database system 200 may modify the modified interpreter 214 to create the reporting engine 220 and the rule engine 216, wherein the reporting engine 220 outputs the source tracking object, the first flow tracking object, and the sink tracking object as dynamic analysis of dataflow in the application program based on the rule engine 216 detecting a rule match with the dataflow.

The Java® virtual machine 202 works by loading the class bytecodes 206, together with the wrapper class 208 and the node class 210 through the class loader 212. Then the class loader 212 passes the loaded classes to the modified interpreter 214, which has the dataflow tracking logic. Once the modified interpreter 214 starts executing the bytecode, the modified interpreter 214 adds dataflows to objects and checks against rules with the rule engine 216. The rule engine 216 loads the rules 218 from a static file at the startup time for the Java® virtual machine 202. More rules 218 can be added dynamically to the rule engine 216. If the rule engine 216 detects a rule match with the dataflow, the rule engine 216 sends the issue to the reporting engine 220. The reporting engine 220 uploads the issue asynchronously to the audit console 222 so that users can view the potential vulnerabilities. If the modified interpreter 214 detects a program hotspot, a region of a program where a significant amount of computation occurs, the modified interpreter 214 invokes the modified just-in-time compiler 224 to compile the code to the native code 226. Then the native code 226 has all of the dataflow tracking logic and checks the rules 218 through the rule engine 216 as needed. Native application programming interfaces in the Node class 210 are provided to invoke the node methods 228 into the Java® virtual machine 202 through the Java® native interface bridge 230.

The definitions of the wrapper class 208 and the node class 210 may be written in Java® code. The Java® virtual machine 202 is modified to load the two classes 208 and 210 with the bootstrap class loader during startup time for the Java® virtual machine 202. The two classes 208 and 210 are inserted into a system dictionary at an early stage during the startup time for the Java® virtual machine 202 so that later references to the classes 208 and 210 can be resolved. The system dictionary in the Java® virtual machine 202 is a table to store information about all of the loaded classes, their loaders and protection domains in the system. The definition of the wrapper and node objects can also be written natively in C++ by constructing the two classes 208 and 210 dynamically in a way that is similar to how the two classes 208 and 210 are constructed for being loaded by the class loader 212.

The Java® virtual machine 202 includes two bytecode interpreters, the default template interpreter, which is modified to become the modified interpreter 214, and an obsolete C++ interpreter. The default template interpreter itself is made up from two components: a platform specific template and a platform agnostic runtime. The platform specific template is written in macro assembly code. The Java® virtual machine 202 has its own macro assembler to assemble the assembly code into machine code at runtime. The platform agnostic runtime is written in C++, is used for complicated logics that cannot be done easily in the assembly template, and is shared among different types of central processing units and operating systems.

In the platform specific template, assembly code is added to all bytecodes that might have a tracking event to gather dataflows. Example bytecodes are method invocations (invokevirtual, invokestatic, etc.), field accesses (getfield, setfield), array accesses (aaload, aastore), etc. The code changes that are implemented in the platform specific template are specific to central processing unit types, but not specific to operating system types. For example, changes are implemented for 32 bit word size x86 processors and 64 bit word size x86 processors. Although there are also template logics specific to each operating system, none of them have any interference on the logics of the dynamic analysis code. Hence, the modified interpreter 214 can be built and used on any x86 platform, regardless of its host operating system.

The platform agnostic runtime is used when the dynamic analysis logic is difficult to write completely in the platform specific template in assembly code. In this case, functions are declared and implemented in the runtime class and these functions are invoked from the assembly code in the platform specific template. The modified runtime class is InterpreterRuntime, which already provides a variety of functions such as resolving method references, check object types, etc. The functions created to support the dynamic analysis logic are mostly related to object splitting and rule enforcement. For example, if the Java® virtual machine 202 comes across function invocations, the Java® virtual machine 202 needs to check the functions against the rules 218 to see whether the current dataflow consists of a vulnerability, and this process is complicated enough to be written completely in assembly code. A function called InterpreterRuntime::pre_invoke is created, and the function is called in the platform specific template via call_VM( ) macro before every Java® method invocation.

Since the modified interpreter 214 also rewrites bytecode/bytecodes into another bytecode at runtime to improve performance, the modified interpreter 214 inserts dataflow tracking logics to the interpreter templates of the new bytecode so that the new bytecodes are also dataflow aware. For example, the "aload_0" and "getfield" bytecode pair is always rewritten to another bytecode called "fast_agetfield", and the modified interpreter 214 inserts the dataflow tracking logics to all three bytecodes in the interpreter template to handle bytecode re-writings.

The logic also has the notion of a system class and a non-system class as discussed above, where dataflow tracking is implemented for dynamic analysis by instrumenting Java® bytecode. Whenever the Java® virtual machine 202 comes across a function in a system class, the Java® virtual machine 202 does not track dataflows as the Java® virtual machine 202 did for functions in a non-system class. This can improve the performance as no object splitting is triggered when the program is running in system classes.

In addition, the Java® virtual machine 202 strips wrappers on entering all native methods because native methods are not interpreted and the native code does not understand the wrapper logic. Hence, in order to still persist dataflow, the Java® virtual machine 202 defines rules for native methods so that the Java® virtual machine 202 can persist/add/remove dataflow information accordingly.

Interpreter templates are modified with the dataflow tracking logics. When a macro assembler takes the interpreter templates as input, the macro assembler produces the modified interpreter 214. For example, the macro assembler takes the following interpreter template:
invoke an method
invokevirtual:
   load_method;
   track_dataflows;
   invoke_method;
as an input to produce as an invokevirtual call to the interpreter runtime for the modified interpreter 214. In another example, the macro assembler takes the following interpreter template:
Get a field
getfield:
   load_field_info;
   track_dataflows;
   load_field_data;
as an input to produce as a getfield call to the interpreter runtime for the modified interpreter 214. In yet another example, the macro assembler takes the following interpreter template:
store an element
aastore:
   load_element_offset;
   track_dataflows;
   store_element;
as an input to produce as an aastore call to the interpreter runtime for the modified interpreter 214. The modified interpreter 214 has all of the dataflow tracking code, and also calls to the interpreter runtime for complicated logic that is hard to do in assembly code.

The Java® virtual machine 202 has compilers to improve Java® program performance. The job of the compilers is to compile the Java® bytecode into native machine code so that the native machine code can be executed without being interpreted directly. The Java® virtual machine 202 detects the methods that are executed most frequently, the hotspots, and chooses these methods as the candidates to go through compilation. The Java® virtual machine 202 has a client compiler, which is mostly used in client-side Java® applications, and a server compiler, which is used in server-side Java® applications. The client compiler is fast in compilation, but does not produce the optimal native code. In contrast, the server compiler is slow in compilation but produces the optimal result. The server compiler is modified to create the modified just-in-time compiler 224 to compile optimal code for detecting vulnerabilities in server side Java® applications.

The way the bytecode is compiled into the native code 226 is modified, similar to the modifications to the modified interpreter 214. The dataflow tracking logic is added whenever a bytecode is being compiled if the bytecode can have an impact on dataflows. The added dataflow logics may be in assembly code in the modified just-in-time compiler 224. However, if some logic is too complicated to carry out completely in assembly code, runtime functions may be created in the C programming language and calls into those functions may be written in assembly code. The runtime functions are written in the SharedRuntime class, which has runtime functions for both interpreter callouts and compiler callouts. The modified just-in-time compiler 224 is modified to take method bytecodes, such as aload_0; getfield; dup; invokevirtual; and areturn; and add dataflow logics to the invokevirtual, getfield, and aastore calls when compiling the native code 226 for a shared runtime.

In addition, the modified just-in-time compiler 224 supports decompilation, which transform the native machine code into a stream of bytecode. This is useful in cases where a program has self-modifying code and needs to redefine the method at runtime. The decompiler is modified to make sure that all of the native code 226 is transformed to the correct bytecodes with the dataflow tracking logic removed. The Java® virtual machine 202 is still be able to track dataflows in the decompiled bytecode because it will be run on the modified interpreter 214, which already has the dataflow tracking logic.

The rule engine 216 checks dataflows against the defined rules 218 and applies the resulting actions in the rule if a match is found. The rule engine 216 may be implemented directly in the Java® virtual machine 202 in the C++ programming language. The rule engine 216 works by reading a rule file from the file system, constructing a hash table to store the rules 218, and enforcing the rules 218 at runtime for different tracking events. The rule 218 file contains information regarding the class, the method, the parameters and the requiring/resulting actions for the dataflow to match. If a dataflow matches a rule, the rule engine 216 sends the dataflow to the reporting engine 220 for reporting and recording.

The rule engine 216 also enforces rules for reflections. If a reflection call is detected, the rule engine 216 applies the rules 218 to the actual parameters of the invocation target instead of the parameters passed to the reflection call. The actual parameters are extracted from the argument array in reflection calls, such as the argument array in Method.invoke or Constructor.newInstance.

However, the rule engine 216 is not limited to only this particular implementation. For example, the rule engine 216 can also read the rules 218 from other sources, such as from a network, etc. Also, the rule engine 216 can use other data structures to store the rules 218 other than a hash table. The rule engine 216 can be separated out to a different thread to improve performance as well. This is achievable because when checking the rules 218, the rule engine 216 is checking the dataflow information associated with a node object, which does not have any impact on the program logic, such that the program can continue to run in its own thread.

The reporting engine 220 reports a finding when a rule is matched, provided that the rule 218 has reporting as the resulting action. For example, the reporting engine 220 can report a security vulnerability when a tainted data flows to a sensitive sink. The reporting engine 220 may be implemented in Java® code with some additional Java® native interfaces developed to call back to the Java® virtual machine 202 when needed. The reporting engine 220 may also run in a separate thread pool to improve performance. At startup time for the Java® virtual machine 202, a thread pool is created and waits on a shared task queue. When the rule engine 216 needs to report anything, the rule engine 216 will push a task onto the shared queue and a thread will be dispatched to report the issue. The reporting engine 220 is also extensible. Users of the reporting engine 220 have the freedom of rewriting the reporting engine 220 to integrate with their auditing tools, logging tools, analytics, etc. through application programming interfaces. The reporting interfaces will be exposed for users to create their own logics in Java® code to handle issue reporting.

As mentioned above, the location of a data point may be implemented with a few integer indexes and a class object instead of a string object for performance reasons. The Java® code in the reporting engine 220 needs to call into the Java® virtual machine 202 to retrieve the string based on the indexes and the class object since only the Java® virtual machine 202 understands them. In order to support this behavior, additional application programming interfaces are implemented using Java® native interfaces that the Java® code can use to call into the Java® virtual machine 202 from their native code. For example, one Java® native interface is the Node.getLocationString( ) It is a native function that calls JVM_GetNodeLocation( ) in the Java® virtual machine 202 This is a way to enable a Java® call into the Java® virtual machine 202 directly through the application programming interfaces, such that users are free to use the application programming interfaces in other places to retrieve the location of the datapoint.

Figure 3:
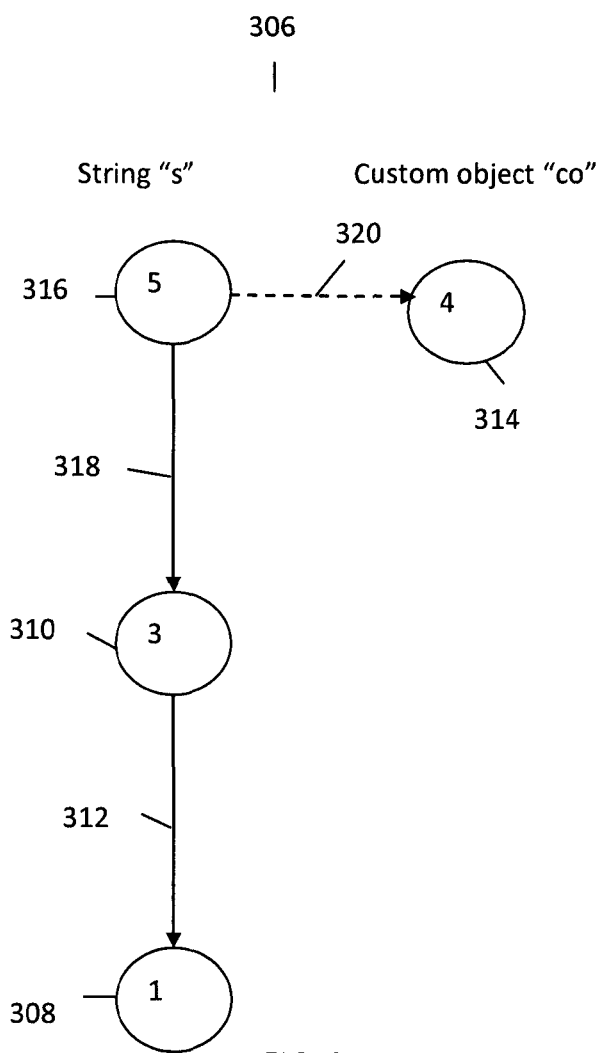
FIG. 3 is a block diagram of a portion of example application code and its associated dataflow graph for a dynamic analysis interpreter modification for application dataflow.

FIG. 3 is a block diagram of a portion of example application code and its associated dataflow graph for dynamic analysis interpreter modification for application dataflow in an embodiment. The block includes a portion of example application code 300, which includes an application code column 302 and a code line number column 304. The block diagram of a portion of example application code and its associated dataflow graph includes also includes a dataflow graph 306.

In the portion of example application code 302, an application program gets a tainted string "s" from the request in line 1, creates a custom object "co" in line 2, assigns the tainted string "s" to a field "x" in the previously untainted custom object "co" in line 3, calls a function "f1" with the previously untainted custom object "co" in line 4, and retrieves the field "x" from the previously untainted custom object "co" for printing in line 5. The database system modifies the interpreter to create new tracking objects during the tracking events, which are getting the parameter "s," assigning the string "s" to the field "x" of the previously untainted custom object "co," calling the function "f1," and printing the field "x," with previously created tracking objects for a specific data object becoming the parents of subsequently created tracking objects for the specific data object. The taint information is stored in a hierarchical way, in which the dataflow is represented by chaining a series of tracking objects that were created along the tracking events through which that the tainted wrapper object flows.

The dataflow graph 306 may evolve based on the following steps. When the application program gets the tainted string "s" from the request in line 1, the database system creates a tracking object 1 308 to record information about getting the tainted sting "s." After the application program assigns the tainted string "s" to the field "x" of the previously untainted custom object "co" in line 3, the database system creates a tracking object 3 310 to record information about the field assignment, and points the tracking object 3 310 to the tracking object 1 308 via the pointer 312. When the application program calls the function "f1" in line 4, the database system creates a tracking object 4 314, but does not point the tracking object 4 314 to the tracking object 3 310 because the tracking object 4 314 records information for the previously untainted custom object "co," whereas the tracking object 3 310 records information for the tainted string "s." When the application program retrieves and prints the field "x" in line 5, the database system creates a tracking object 5 316 to record information about the data sink, and points the tracking object 5 316 to the tracking object 3 310 via a pointer 318. Based on the preceding, the database system may indicate that the detected dataflow is {1, 3, 5}.

However, this is incorrect because the ideal dataflow graph for the portion of example application code 302 is {1, 3, 4, 5}. This ideal dataflow indicates where the tainted data was introduced in line 1, how the tainted data flowed in the application program, such as being assigned to a field "x" of the previously untainted custom object "co" in line 3, and eventually reached the data sink in line 5. The database system should also indicate any relevant events, such as calling the function "f1" with the previously untainted custom object "co" in line 4, which may impact on the final vulnerability and its dataflow.

In order to correct the dataflow {1, 3, 5}, the database system adds the tracking object 4 214, which enables the reporting of the corresponding node as part of the dataflow graph 306. The reason is that the tracking object 4 314 records information related to the previously untainted custom object "co," which initially does not appear to be related to the information recorded for the custom string "s." Since the database system already records information for the tainted string "s" and the previously untainted custom object "co," the database system concatenates the taint propagation of the string "s" with that of the previously untainted custom object "co" so that when the tainted data reaches a data sink, and the complete dataflow {1, 3, 4, 5} is output. The database system identifies a field retrieval as the operation that indicates when the potential dataflow for the previously untainted custom object "co" is concatenated with the dataflow for the tainted string "s." Therefore, when the application program retrieves the tainted string "s" from the field "x" of the previously untainted custom object "co" for printing in line 5, the database system adds the "potential" pointer 320 to point from the tracking object 5 316 to the most recent tracking object for the previously untainted custom object "co," which is the tracking object 4 314 in this example. Hence, when the application program reaches the data sink in line 5, the database system bases the dataflow 306 on the lines {1, 3, 4, 5}, which is reported as the vulnerability path because the tainted string "s" may not have been sanitized during the function call in line 4. The modified interpreter enables adding the taint information from all tracking objects, even the tracking objects which do not initially appear to be directly related to the tainted data. Whenever a tainted wrapper object reaches a data sink, the database system may climb up the tracking object tree associated with the data sink to determine if the associated dataflow represents a vulnerability.

Although the application code 300 and the dataflow graph 306 depict simplified examples of dynamic analysis tracking object associations for application program dataflow, the code 300 and the graph 306 may depict more complex dataflows. For example, if the code 300 included multiple function calls using the previously untainted custom object "co," the graph 306 would include multiple linked nodes depicting the dataflow for the previously untainted custom object "co," with the potential" pointer 320 pointing to the tracking object that records information for the most recently called function. In another example, the application program may get another tainted string "y" and assign the tainted string "y" as another field of the previously untainted custom object "co," such that the database system creates a linked node sequences for the tainted string "s," creates a linked node sequences for the tainted string "y," and creates a linked node sequences for the previously untainted custom object "co." In this example, the database system creates one "potential" pointer pointing from the node for the data sink for the string "s" to the most recent node for the previously untainted custom object "co" before the application program reached the data sink for the string "s," and another "potential" pointer pointing from the node for the data sink for the string "y" to the most recent node for the previously untainted custom object "co" before the application program reached the data sink for the string "y." In yet another example, the code 300 may include nested objects, where the tainted string "s" is embedded deeply into other previously untainted objects, and the graph 306 reflects such deep embedding accordingly.

The database system provides the graph 306 by concatenating the complete dataflow of a tainted object and the complete data flow of a previously untainted object that receives a field assignment of the tainted object, thereby providing a system user with sufficient information about the creation of the previously untainted object, when the tainted object was retrieved, when the tainted object was assigned as a field of the previously untainted object, and how the tainted object flows within the previously untainted object. In case the information about the previously untainted object prior to the field assignment of the tainted object is not needed for analysis of vulnerabilities, the database system may add a "taint assignment" field to the tracking object, or node object, to record when the tainted object was assigned as a field of the previously untainted object. Using the "taint assignment" field, the database system may remove the nodes from the graph 306 that correspond to information recorded prior to the taint assignment, thereby making the graph 306 more concise.

System Overview

Figure 4:
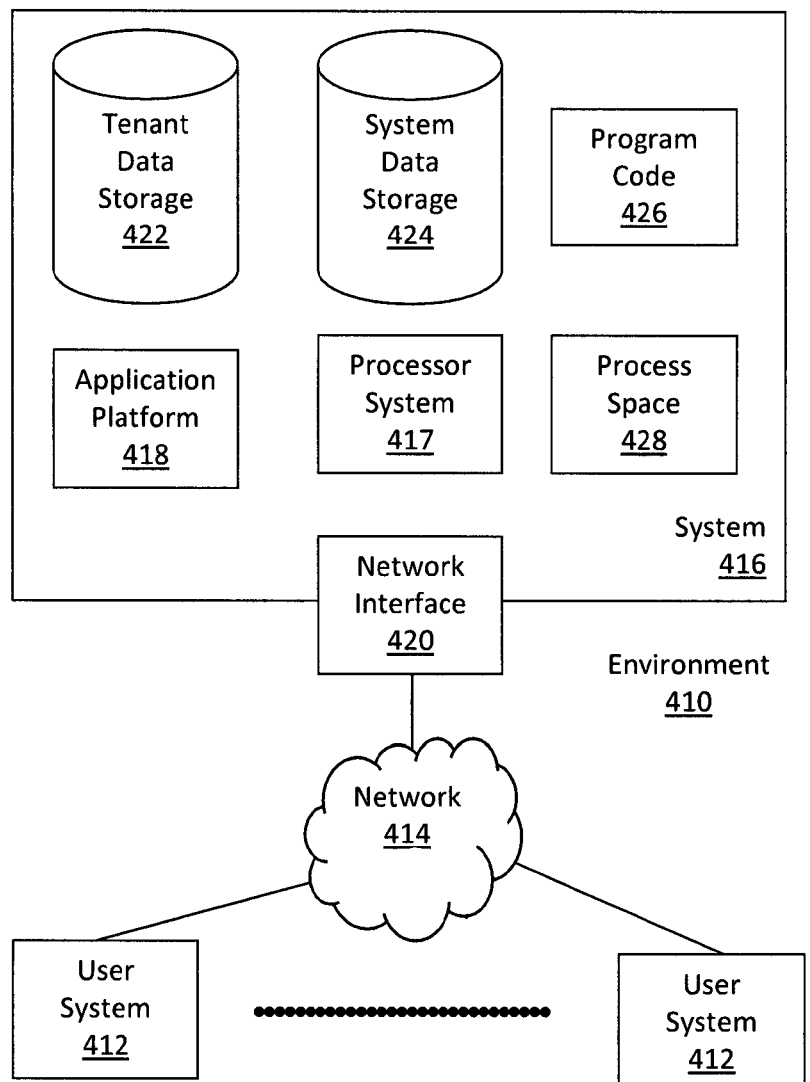
FIG. 4 illustrates a block diagram of an example of an environment wherein an on-demand database service might be used.

FIG. 4 illustrates a block diagram of an environment 410 wherein an on-demand database service might be used. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network 414 with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java®, JavaScript, ActiveX, any other scripting language, such as VBScript, and many other programming languages as are well known may be used. (Java® is a trademark of Sun Microsystems, Inc.).

According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 5:
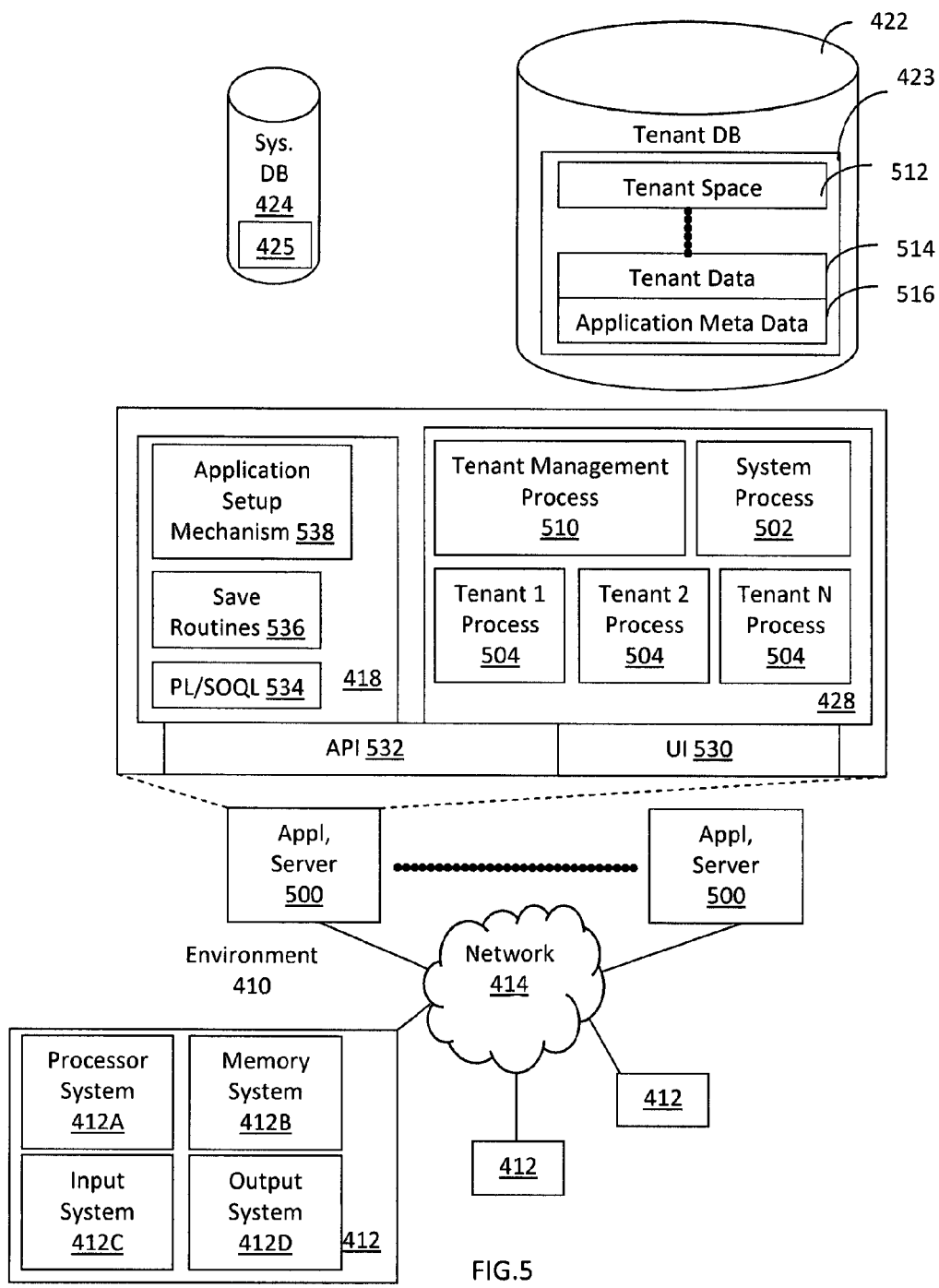
FIG. 5 illustrates a block diagram of an embodiment of elements of FIG. 4 and various possible interconnections between these elements.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 34 that provides a programming language style interface extension to API 532. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N-1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. An apparatus for dynamic analysis interpreter modification for application dataflow, the apparatus comprising:
   a processor; and a non-transitory computer readable medium storing a plurality of instructions, which when executed, cause the one or more processors to:

modify an interpreter to create a source tracking object for a data object received from a data source;

modify the interpreter to record information associated with the data source into the source tracking object;

modify the interpreter to create a copy of the data object for a tracking event in an application program;

modify the interpreter to create a flow tracking object for the tracking event;

modify the interpreter to record information associated with the tracking event into the flow tracking object as the tracking event processes the copy of the data object;

modify the interpreter to create a sink tracking object for outputting the copy of the data object to a data sink;

modify the interpreter to record information associated with the data sink into the sink tracking object; and output the source tracking object, the flow tracking object, and the sink tracking object as dynamic analysis of dataflow in the application program.

2. The apparatus of claim 1, wherein the tracking event comprises one of a method invocation, an assignment, and a field assignment of the copy of the wrapper object to a field of another wrapper object.

3. The apparatus of claim 1, wherein the plurality instructions, which when executed further cause the one or more processors to:

modify the interpreter to replace the data object with a wrapper object that points to the data object;

modify the interpreter to create a second wrapper object for a second tracking event in the application program;

modify the interpreter to create a second flow tracking object for the second tracking event;

modify the interpreter to record information associated with the second tracking event into the second flow tracking object as the second tracking event processes the second wrapper object;

modify the interpreter to associate the flow tracking object with the second flow tracking object in response to a field retrieval of the copy of the wrapper object from the second wrapper object; and output the associated second flow tracking object as dynamic analysis of dataflow in the application program.

4. The apparatus of claim 3, wherein the plurality instructions, which when executed further cause the one or more processors to:

modify the interpreter to connect the source tracking object with the wrapper object;

modify the interpreter to connect the flow tracking object with the copy of the wrapper object;

modify the interpreter to connect the second flow tracking object with the second wrapper object; and modify the interpreter to connect the sink tracking object with the copy of the wrapper object.

5. The apparatus of claim 4, wherein outputting the source tracking object, the flow tracking object, and the sink tracking object comprises outputting the source tracking object as a first node in a graph, the flow tracking object as a second node in the graph, the associated second flow tracking object as a third node in the graph, and the sink tracking object as a fourth node in the graph, wherein the second node is linked to the first node, the third node is linked to the second node, and the fourth node is linked to the third node to depict the dataflow sequence of the graph.

6. A non-transitory machine-readable medium carrying one or more sequences of instructions dynamic analysis interpreter modification for application dataflow, which instructions, when executed by one or more processors, cause the one or more processors to:

modify an interpreter to create a source tracking object for a data object received from a data source;

modify the interpreter to record information associated with the data source into the source tracking object;

modify the interpreter to create a copy of the data object for a tracking event in an application program;

modify the interpreter to create a flow tracking object for the tracking event;

modify the interpreter to record information associated with the tracking event into the flow tracking object as the tracking event processes the copy of the data object;

modify the interpreter to create a sink tracking object for outputting the copy of the data object to a data sink;

modify the interpreter to record information associated with the data sink into the sink tracking object; and output the source tracking object, the flow tracking object, and the sink tracking object as dynamic analysis of dataflow in the application program.

7. The machine-readable medium of claim 6, wherein the tracking event comprises one of a method invocation, an assignment, and a field assignment of the copy of the wrapper object to a field of another wrapper object.

8. The machine-readable medium of claim 6, wherein the instructions, when executed by one or more processors, further cause the one or more processors to:

modify the interpreter to replace the data object with a wrapper object that points to the data object;

modify the interpreter to create a second wrapper object for a second tracking event in the application program;

modify the interpreter to create a second flow tracking object for the second tracking event;

modify the interpreter to record information associated with the second tracking event into the second flow tracking object as the second tracking event processes the second wrapper object;

modify the interpreter to associate the flow tracking object with the second flow tracking object in response to a field retrieval of the copy of the wrapper object from the second wrapper object; and output the associated second flow tracking object as dynamic analysis of dataflow in the application program.

9. The machine-readable medium of claim 8, wherein the instructions, when executed by one or more processors, further cause the one or more processors to:

modify the interpreter to connect the source tracking object with the wrapper object;

modify the interpreter to connect the flow tracking object with the copy of the first wrapper object;

modify the interpreter to connect the second flow tracking object with the second wrapper object; and modify the interpreter to connect the sink tracking object with the copy of the wrapper object.

10. The machine-readable medium of claim 9, wherein outputting the source tracking object, the flow tracking object, and the sink tracking object comprises outputting the sink tracking object as a first node in a graph, the flow tracking object as a second node in the graph, the associated second flow tracking object as a third node in the graph, and the sink tracking object as a fourth node in the graph, wherein the second node is linked to the first node, the third node is linked to the second node, and the fourth node is linked to the third node to depict the dataflow sequence of the graph.

11. A method for dynamic analysis interpreter modification for application dataflow, the method comprising:
modifying an interpreter to create a source tracking object for a data object received from a data source;
modifying the interpreter to record information associated with the data source into the source tracking object;
modifying the interpreter to create a copy of the data object for a tracking event in an application program;
modifying the interpreter to create a flow tracking object for the tracking event;
modifying the interpreter to record information associated with the tracking event into the flow tracking object as the tracking event processes the copy of the data object;
modifying the interpreter to create a sink tracking object for outputting the copy of the data object to a data sink;
modifying the interpreter to record information associated with the data sink into the sink tracking object; and
outputting the source tracking object, the flow tracking object, and the sink tracking object as dynamic analysis of dataflow in the application program.

12. The method of claim 11, wherein the tracking event comprises one of a method invocation, an assignment, and a field assignment of the copy of the wrapper object to a field of another wrapper object.

13. The method of claim 11, wherein the method further comprises:
modifying the interpreter to replace the data object with a wrapper object that points to the data object;
modifying the interpreter to create a second wrapper object for a second tracking event in the application program;
modifying the interpreter to create a second flow tracking object for the second tracking event;
modifying the interpreter to record information associated with the second tracking event into the second flow tracking object as the second tracking event processes the second wrapper object;
modifying the interpreter to associate the flow tracking object with the second flow tracking object in response to a field retrieval of the copy of the wrapper object from the second wrapper object; and
outputting the associated second flow tracking object as dynamic analysis of dataflow in the application program.

14. The method of claim 13, wherein the method further comprises:
modifying the interpreter to connect the source tracking object with the wrapper object;
modifying the interpreter to connect the flow tracking object with the copy of the first wrapper object;
modifying the interpreter to connect the second flow tracking object with the second wrapper object; and
modifying the interpreter to connect the sink tracking object with the copy of the wrapper object.

15. The method of claim 14, wherein outputting the source tracking object, the flow tracking object, and the sink tracking object comprises outputting the source tracking object as a first node in a graph, the flow tracking object as a second node in the graph, the associated second flow tracking object as a third node in the graph, and the sink tracking object as a fourth node in the graph, wherein the second node is linked to the first node, the third node is linked to the second node, and the fourth node is linked to the third node to depict the dataflow sequence of the graph.

16. A system comprising:
a computer having one or more processors;
a processor-based application, which when executed by the computer, will cause the one or more processors to:
modify an interpreter to create a source tracking object for a data object received from a data source;
modify the interpreter to record information associated with the data source into the source tracking object;
modify the interpreter to create a copy of the data object for a tracking event in an application program;
modify the interpreter to create a flow tracking object for the tracking event;
modify the interpreter to record information associated with the tracking event into the flow tracking object as the tracking event processes the copy of the data object;
modify the interpreter to create a sink tracking object for outputting the copy of the data object to a data sink;
modify the interpreter to record information associated with the data sink into the sink tracking object; and
output the source tracking object, the flow tracking object, and the sink tracking object as dynamic analysis of dataflow in the application program.

17. The system of claim 16, wherein the tracking event comprises one of a method invocation, an assignment, and a field assignment of the copy of the wrapper object to a field of another wrapper object.

18. The system of claim 16, wherein the processor-based application, when executed, will further cause the one or more processors to:
modify the interpreter to replace the data object with a wrapper object that points to the data object;
modify the interpreter to create a second wrapper object for a second tracking event in the application program;
modify the interpreter to create a second flow tracking object for the second tracking event;
modify the interpreter to record information associated with the second tracking event into the second flow tracking object as the second tracking event processes the second wrapper object;
modify the interpreter to associate the flow tracking object with the second flow tracking object in response to a field retrieval of the copy of the wrapper object from the second wrapper object; and
output the associated second flow tracking object as dynamic analysis of dataflow in the application program.

19. The system of claim 18, wherein the processor-based application, when executed, will further cause the one or more processors to:
modify the interpreter to connect the source tracking object with the wrapper object;
modify the interpreter to connect the flow tracking object with the copy of the wrapper object;
modify the interpreter to connect the second flow tracking object with the second wrapper object; and
modify the interpreter to connect the sink tracking object with the copy of the wrapper object.

20. The system of claim 16, wherein outputting the source tracking object, the flow tracking object, and the sink tracking object comprises outputting the sink tracking object as a first node in a graph, the flow tracking object as a second node in the graph, the associated second flow tracking object as a third node in the graph, and the sink tracking object as a fourth node in the graph, wherein the second node is linked to the first node, the third node is linked to the second node, and the fourth node is linked to the third node to depict the dataflow sequence of the graph.

* * * * *